3,280,065
LATEX STABILIZATION AND PRESERVATION

Ralph R. Langner, Lake Jackson, Tex., assignor to The Dow Chemical Company, Midland, Mich., a corporation of Delaware
No Drawing. Filed Sept. 20, 1963, Ser. No. 310,448
12 Claims. (Cl. 260—29.7)

This invention relates to stabilized latex compositions and to a process for producing such stabilized latex compositions. More particularly, the present invention relates to the preservation of latexes by incorporating a heterocyclic compound containing a 1,4-dioxanone ring in the molecule or the hydrolysis products (such as 2-hydroxyethoxyacetic acid) of such dioxanones into the latex to produce a latex composition stabilized against biological attack.

It is well known that both natural and synthetic latexes are susceptible to attack by micro-organisms, especially bacteria and fungi. Such attack alters the properties of the latex. Numerous inhibitors, stabilizers and preservatives have been used to prevent the spoilage of such latexes. Examples of typical inhibitors include hypochlorites, formaldehyde, organomercury compounds and inorganic arsenates, to name only a few. Good preservatives and inhibitors must possess several other properties in addition to bactericidal and fungicidal activity. For example, the preservative must be compatible with the latex and must not affect the homogeneity of the film formed from the latex. In addition, a good preservative must be inert to other additives (such as viscosity stabilizers) and should not break down the latex physically or chemically.

It has now been found that the biologically-induced spoilage of both natural and synthetic latexes can be controlled without adversely affecting the properties of the latex by incorporating an inhibiting amount of 2-para-dioxanone or alkyl-substituted derivatives of 2-para-dioxanone into the latex. The compounds which are useful as active preservative ingredients may be represented by the following formula (I)
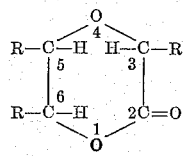

wherein each R may be the same or different and each R is independently selected from the group consisting of a hydrogen atom and an alkyl group of from one to two carbon atoms (methyl and ethyl groups). Examples of such compounds include 2-p-dioxanone (1,4-dioxan-2-one), 3,5-dimethyl-1,4-dioxan-2-one, 3-methyl-6-ethyl-1,4-dioxan-2-one, 3,5,6 - trimethyl-1,4-dioxan-2-one and 6-methyl-1,4-dioxan-2-one.

These dioxanones may also be employed in the form of their hydrolysis products. Since the dioxanones employed in this invention are lactones, the principal hydrolysis products are lactone polymers and 2-hydroxyalkoxyalkanoic acids

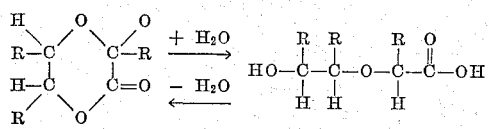

the above equation represents an equilibrium mixture which is predominantly free acid. When the latex is applied as a paint and dried, more lactone would be formed, wherein R is as previously defined in Formula I. In dilute aqueous solutions (such as are present in latexes), formed. Thus, both the lactones and the hydrolysis products of the lactones are useful latex preservatives.

The stabilized latex compositions are prepared by mixing an inhibiting amount (usually no more than about five percent by weight) of the 2-para-dioxanone (or alkyl-substituted derivatives), which may be in the form of an equilibrium mixture of the lactone and its hydroxylsis products, into the natural or synthetic latex. Amounts of 2-p-dioxanone or its alkyl-substituted derivatives of from 0.1 percent to about 5 percent by weight may be used with amounts of from about 0.1 percent to about 0.25 percent being preferred. Although amounts of less than about 0.1 percent of the inhibitor may be used, the biocidal properties obtained are marginal. This is especially true of latexes which contain high levels of emulsifiers and those latexes which have been neutralized with ammonia. When amounts of inhibitor are employed at concentrations greater than about 5 percent by weight, the water sensitivity and stability against coagulation of the latex may be affected. Concentrations greater than about 5 percent by weight may be used if the latex properties are not critical, but the use of such amounts has not shown any increased effectiveness. Although the dioxanones may be present in the form of their hydrolysis products, concentrations are calculated in terms of pure dioxanones. If the preservatives are used in the form of hydrolysis products, the dioxanone concentration is calculated by assuming a 100 percent dehydration of the 2-hydroxyalkoxyalkanoic acid to the corresponding lactone.

The 2-p-dioxanone and alkyl-substituted 2-p-dioxanones which are used as preservatives may be incorporated into any latex, synthetic or natural. The 2-p-dioxanone or alkyl-substituted 2-p-dioxanones may be hydrolyzed prior to incorporation into the latex, or added directly to the latex. Typical conventional latexes which may be treated to give spoilage-resistant latex compositions include styrene-butadiene-based latexes, acrylonitrile-based latexes, vinyl acetate-based latexes and styrene-butadiene-vinyl acid latexes (including styrene-butadiene-acrylic acid and fumaric acid latexes).

For the purpose of this specification, a latex is defined to be a water suspension of polymerizable and/or polymerized material. The percent solids in most latexes is not more than about sixty or seventy percent by weight. Natural rubber latex contains about 35 percent by weight of rubber.

Suitable latexes which may be stabilized according to the present invention include latexes obtained from polymerizable olefinic compounds such as $C_1$–$C_{18}$ primary and second alkyl and alkenyl esters of acrylic acid and/or methacrylic acid. Examples of such polymerizable esters include methyl acrylate, ethyl acrylate, n-propyl acrylate, i-propyl acrylate, n-butyl acrylate, i-butyl acrylate, sec.-butyl acrylate, n-amyl acrylate, i-amyl acrylate, n-hexyl acrylate, 2-ethylhexyl acrylate, octyl acrylate, 3,5,5-trimethylhexyl acrylate, dodecyl acrylate, decyl acrylate, cetyl acrylate, octadecyl acrylate, octadecenyl acrylate, methyl methacrylate, ethyl methacrylate, n-propyl methacrylate, n-butyl methacrylate, n-amyl methacrylate, sec.-amyl methacrylate, hexyl methacrylate, 2-ethylbutyl methacrylate, octyl methacrylate, 3,5,5-trimethylhexyl methacrylate, decyl methacrylate, dodecyl methacrylate and octadecyl methacrylate.

Other latexes may be obtained from polymerizable esters such as glycidyl esters of monoethylenically unsaturated monocarboxylic acids (for example, glycidyl acrylate). Still other latexes are obtained from unsaturated diesters. Such diesters may be formed by reacting an alkylenediol with an ethylenically unsaturated monocarboxylic acid to form compounds such as ethylene dimethyacrylate. Other polymerizable compounds suitable for the production of latexes include acrylic acid, methacrylic acid, maleic acid, fumaric acid, crotonic acid, acrylonitrile and methacrylonitrile.

An especially useful class of latex-forming unsaturated compounds include compounds of the formula

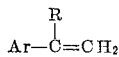

wherein Ar— represents a monovalent aromatic moiety of from about 6 to 10 carbon atoms (which may contain halogen or alkyl substituents) and R may be a hydrogen atom, a lower alkyl group (from 1 to 4 carbon atoms) or a halogen atom with an atomic number between 16 and 36 (such as chlorine and bromine). Examples of such compounds include styrene, α-methylstyrene, α-chlorostyrene and nuclearly substituted styrenes, such as o-methylstyrene, p-methylstyrene, m-methylstyrene, and the like, wherein the substituent is an alkyl group such as methyl, ethyl, n-propyl, n-butyl or a halogen such as chlorine or bromine.

Still other polymerizable materials useful for forming latexes which can be preserved according to this invention include aliphatic conjugated dienes of from 4 to 9 carbon atoms (for example, butadiene and isoprene) as well as vinyl esters and ethers (vinyl acetate, vinyl n-propionate, vinyl n-butyrate and allyl glycidyl ether), vinyl halides (vinyl chloride) and vinylidene halides (vinylidene chloride).

The following examples are submitted for the purpose of illustration only and are not to be construed as limiting the scope of the invention in any way.

EXAMPLE I

To a latex (pH 8.8) composed of 46 percent by weight of solids (solids composition: copolymer of 67 percent by weight ethyl acrylate and 33 percent by weight methyl methacrylate) in water was added a sufficient quantity of 2-para-dioxanone to give a 0.5 percent by weight concentration of 2-para-dioxanone in the latex. This treated latex was streaked on a plate containing nutrient agar and the plate was incubated for 48 hours at 25° C. No bacterial growth was observed.

A 100 milliliter sample of the treated latex was then inoculated with 0.1 milliliter of a similar latex (containing no 2-para-dioxanone) which was contaminated with *Pseudomonas aeruginosa,* a common bacteria contaminant of latex. The inoculated latex was allowed to set for 48 hours at 25° C. and was then streaked on a plate containing nutrient agar. The plate was incubated at 25° C. for 48 hours. The latex was sterile. This cycle (streaking of nutrient agar with an inoculated latex containing 0.5 percent by weight of 2-para-dioxanone followed by incubation for 48 hours at 25° C.) was repeated 10 times by adding an additional 0.1 milliliter of contaminated latex to the 100 milliliter sample prior to incubation and the latex remained sterile (no bacterial growths developed). After the 10th cycle, the original latex had aged approximately 20 days.

After the last inoculation, a total of 1 milliliter of contaminated latex had been added to the original 100 milliliter sample.

EXAMPLE II

Using a procedure similar to that described in Example I, a latex (pH 2.4–2.8) composed of 46.5 percent by weight of solids (approximate solids composition: terpolymer of 62.65 percent butyl acrylate, 34.4 percent acrylonitrile and 3.01 percent by weight of methacrylic acid) was combined with an amount of 2-para-dioxanone sufficient to give a latex composition containing 0.1 percent by weight of 2-para-dioxanone. A 100 milliliter sample of the treated latex was inoculated three times with 0.1 milliliter of a latex contaminated with *Pseudomonas aeruginosa.* After each inoculation, a plate containing nutrient agar was streaked with the inoculated latex composition containing 2-paradioxanone. The treated latex remained sterile. Testing was stopped after three inoculations (a total of 0.3 milliliter of contaminated latex was added).

EXAMPLE III

In a manner similar to the preceding examples, 2-para-dioxanone was added to a latex (pH 8.8) composed of 50 percent solids (solids composition: copolymer of 67 percent ethyl acrylate, 33 percent by weight methyl methacrylate). The treated latex contained 10 percent by weight of 2-para-dioxanone. Some coagulation occurred at this concentration of 2-para-dioxanone and the pH was reduced. The latex remained sterile after a series of three inoculations (0.1 milliliter of contaminated latex per 100 milliliter sample of latex containing p-dioxanone) and three incubation periods of 48 hours at 25° C. of the streaked nutrient agar plates were carried out according to the procedure of Example II. A total of 0.3 milliliter of contaminated latex was added to the 100 milliliter sample.

EXAMPLES IV–IX

A series of inoculations, agar streaks, and incubations of the streaked agar plates for 48 hours at 25° C. was carried out using various types of latexes with differing amounts of 2-para-dioxanone and alkyl-substituted 1,4-dioxanones. The results are summarized in Table 1.

*Table 1*

| Example Number | Latex Composition | Preservative | Percent by Weight of Preservative in Latex | Preservative [1] Effect | Total Milliliters of Contaminated Latex Added to 100 Milliliter Sample |
|---|---|---|---|---|---|
| IV | Styrene-butadiene latex; 48 percent solids | 2-p-dioxanone | 0.5 | 3 | 0.3 |
| V | Styrene-butadiene-acrylic acid latex; 48 percent solids. | ----do---- | 4.0 | 3 | 0.3 |
| VI | Vinyl acetate latex; 50 percent solids | ----do---- | 1.0 | 3 | 0.3 |
| VII | 46 Percent by weight solids in water. Composition: 67 percent by weight ethyl acrylate and 33 percent by weight methyl methacrylate. (Same as Example I.) | 3,5-dimethyl-2-p-dioxanone. | 1.0 | 15 | 1.5 |
| VIII | 65 Percent vinyl acetate, 35 percent by weight ethyl acrylate, 50 percent solids. | ----do---- | 1.0 | 3 | 0.3 |
| IX | 65 Percent vinyl acetate, 35 percent by weight ethyl acrylate, 48 percent solids. | 2-p-dioxanone | 1.0 | 3 | 0.3 |

[1] The preservative effect was measured by recording the number of inoculations given to the treated latex without showing any growth of *Pseudomonas aeruginosa* when the inoculated samples were streaked on agar plates and incubated for 48 hours at 25° C. The inoculation procedure was the same as was used in Examples I–III. Each inoculation represents an additional 0.1 milliliter of contaminated latex added to the original 100-milliliter sample.

I claim as my invention:
1. A process for stabilizing a latex against biological degradation which comprises incorporating into said latex an inhibiting amount of a lactone compound of the formula

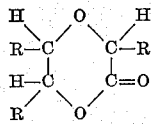

wherein each R is independently selected from the group consisting of a hydrogen atom and an alkyl group of no more than two carbon atoms.

2. The process of claim 1 wherein the lactone compound is in equilibrium with its hydrolysis products.

3. A process for stabilizing a latex against biological degradation which comprises incorporating an inhibiting amount of 2-para-dioxanone into said latex.

4. A process for stabilizing a latex against biological degradation which comprises incorporating an inhibiting amount of an aqueous equilibrium mixture of 2-para-dioxanone and its hydrolysis products into said latex.

5. A process for stabilizing a latex against biological degradation which comprises incorporating an inhibiting amount of 3,5-dimethyl-2-para-dioxanone into said latex.

6. A latex composition stabilized against biological degradation containing an inhibiting amount of a compound of the formula

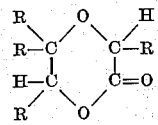

wherein R is independently selected from the group consisting of the hydrogen atom and an alkyl group of no more than two carbon atoms in an equilibrium mixture with its hydrolysis products.

7. A later composition stabilized against biological degradation containing an inhibiting amount of 2-para-dioxanone.

8. A latex composition stabilized against biological degradation containing an inhibiting amount of a mixture of 2-para-dioxanone and its hydrolysis products.

9. A latex composition stabilized against biological degradation containing an inhibiting amount of 3,5-dimethyl-2-para-dioxanone.

10. A latex composition stabilized against biological degradation containing an inhibiting amount of a mixture of 3,5-dimethyl-2-para-dioxanone and its hydrolysis products.

11. A styrene-butadiene latex containing from 0.1 percent to about 5 percent by weight of 2-para-dioxanone.

12. The composition of claim 11 wherein the 2-para-dioxanone is in an equilibrium mixture with its hydrolysis products.

References Cited by the Examiner

UNITED STATES PATENTS 2,631,989   3/1953   Padbury _____ 260—29.7
2,685,538   8/1954   Stinchfield et al. ____ 260—29.7
2,803,646   8/1957   Bell et al. _____ 260—340.2

MURRAY TILLMAN, *Primary Examiner.*

J. ZIEGLER, *Assistant Examiner.*

UNITED STATES PATENT OFFICE
CERTIFICATE OF CORRECTION

Patent No. 3,280,065                                October 18, 1966

Ralph R. Langner

It is hereby certified that error appears in the above numbered patent requiring correction and that the said Letters Patent should read as corrected below.

Column 1, after last formula in the column, line 69, insert the following:

> wherein R is as previously defined in formula (I). In dilute aqueous solutions (such as are present in latexes), column 2, lines 4 and 5, strike out "wherein R is as previously defined in Formula I. In dilute aqueous solutions (such as are present in latexes),"; line 12, for "hydroxylsis" read -- hydrolysis --; line 56, for "second" read -- secondary --; column 3, lines 7 and 8, for "dimethyacrylate" read -- dimethacrylate --; column 6, line 5, for "later" read -- latex --.

Signed and sealed this 12th day of September 1967.

(SEAL)
Attest:

ERNEST W. SWIDER                             EDWARD J. BRENNER
Attesting Officer                              Commissioner of Patents